(Model.)

T. NEWEY, Jr.
AUGER.

No. 305,625. Patented Sept. 23, 1884.

Witnesses.
Robert Errett,
Vinton Coombe

Inventor.
Thomas Newey Jr.
By James L. Norris.
Atty.

UNITED STATES PATENT OFFICE.

THOMAS NEWEY, JR., OF BIRMINGHAM, COUNTY OF WARWICK, ENGLAND.

AUGER.

SPECIFICATION forming part of Letters Patent No. 305,625, dated September 23, 1884.

Application filed May 27, 1884. (Model.) Patented in England April 30, 1884, No. 7,000.

*To all whom it may concern:*

Be it known that I, THOMAS NEWEY, the younger, a subject of the Queen of Great Britain, residing at 39 Allison street, Birmingham, in the county of Warwick, England, gimlet and auger manufacturer, have invented a certain new and useful Improved Screw or Brace Auger, (for which I have obtained a patent in Great Britain, No. 7,000, bearing date April 30, 1884,) of which the following is a specification.

My said invention relates to a new or improved screw or brace auger for boring soft and hard wood.

It is the purpose of my invention to provide a screw-auger having no central gimlet-point, and provided with cutters which extend from the outer edge across the diameter of the auger to the center, said cutters lying in different but substantially parallel lines, and being brought to points in the center of the tool, and slightly curved downward, whereby the auger will readily "bite" or engage with the wood, and will travel without pressure at a high rate of speed.

In boring wood it is frequently desirable that the wood should not be entirely pierced, but in cases where it is necessary that the auger-hole should almost extend through the entire thickness of the wood the gimlet-point of the auger does, in fact, pierce entirely through the wood, making a hole which, in many cases, has to be plugged. In the ordinary shell-auger it is always necessary to gouge or cut away a small piece of the surface-wood to enable the auger to take hold or bite.

My new or improved auger has neither gimlet-point, screw, worm, or shell-nose, but, instead, it has two cutting-edges at its point. It has also two twists or clearance-passages for the escape of the woody débris made during the cutting or boring process.

Figure 1:
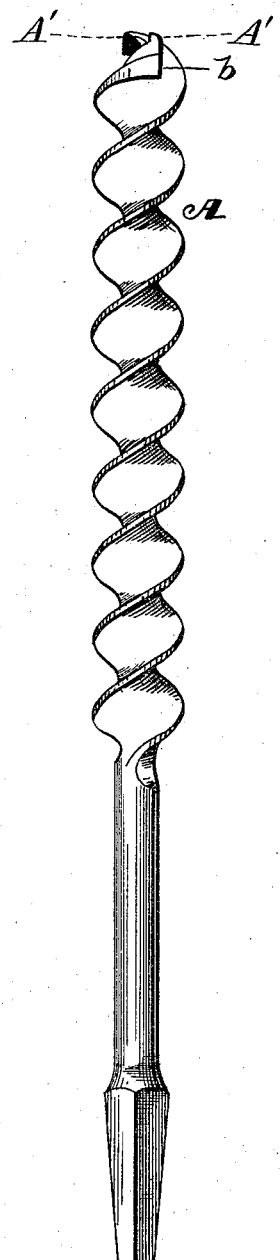
Figure 2:
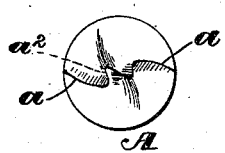
Figure 3:
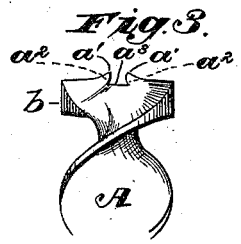

Referring to the drawings, Figure 1 is a side elevation of an auger constructed in accordance with my invention. Fig. 2 is a plan or end view of the cutters. Fig. 3 is a side elevation, the auger being turned into position to show the cutters.

In the said drawings, the letter A indicates the auger, and the letters A' A' the cutters. The latter, as shown in Figs. 2 and 3, extend from the outer edge of the tool to the center, forming cutting-edges $a\ a$, which lie in different but substantially parallel lines. The points $a'\ a'$ of these cutting-edges are slightly curved downward, as shown in Fig. 3, whereby the tool will readily bite into the wood and travel through it without pressure. From each point $a'$ the metal extends upward (the tool being in a working position) and outward, forming an inclined edge, $a^2$, which unites with a central web, $a^3$. These inclined edges, acting in combination with the downwardly-curved points $a'$, give a most powerful bite to the tool and cause it to travel with great speed without pressure. At each outer extremity of the cutting-edges $a\ a$ is formed an upwardly-extending cutting-lip, $b$, the function of which requires no description.

A tool constructed in accordance with this invention will bite into any kind of wood without any preparatory cutting away of the latter, as is usually necessary in such tools as heretofore constructed. It will cut evenly and smoothly to any depth, and, having no screw or worm to impede its progress, it will travel either with or against the grain, and at a speed one-third greater than that of a gimlet-pointed auger, and will readily clear itself of chips and other accumulating débris.

I am aware that an auger has heretofore been constructed with a circular band having a cutting-edge and a cutting-lip arranged substantially on the same horizontal plane to dispense with the usual gimlet-point, and such, therefore, I do not broadly claim.

What I claim is—

1. An auger having two cutting-edges extending from the outside edge of the tool to its center, and having the central points curved slightly downward, said cutting-edges being in different but substantially parallel lines, substantially as described.

2. In a pointless auger, the combination, with upwardly-extending lips upon opposite sides of the tool, of horizontal cutting-edges extending from said lips toward the center, the points of said edges being bent downward, and the metal extending from each point upward and outward to a central web, substantially as described.

3. The auger shown and described, consisting of a twisted body, A, having cutting-edges $a$, with points $a'$, curved downward, as described, and upwardly-extending lips $b$, substantially as described.

In testimony whereof I have hereto set my hand this 7th day of May, 1884.

THOMAS NEWEY, JUNR.

Witnesses:
  J. HOTTRELL,
  CHARLES GERRARD,
*Clerks to E. T. Ratcliff, Notary Public, Birmingham.*